(12) United States Patent
Darwish

(10) Patent No.: US 12,328,299 B2
(45) Date of Patent: Jun. 10, 2025

(54) SYSTEM, METHOD AND NON-TRANSITORY COMPUTER READABLE MEDIUM FOR AN INTERNET-ENABLED NETWORK RADIO NODE

(71) Applicant: RAKUTEN SYMPHONY, INC., Tokyo (JP)

(72) Inventor: Ahmed Darwish, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/010,309

(22) PCT Filed: Sep. 29, 2022

(86) PCT No.: PCT/JP2022/036496
§ 371 (c)(1),
(2) Date: Dec. 14, 2022

(87) PCT Pub. No.: WO2024/069868
PCT Pub. Date: Apr. 4, 2024

(65) Prior Publication Data
US 2024/0305606 A1    Sep. 12, 2024

(51) Int. Cl.
*H04L 9/32* (2006.01)
*H04L 9/00* (2022.01)
(Continued)

(52) U.S. Cl.
CPC ........ *H04L 63/0272* (2013.01); *H04L 9/3236* (2013.01); *H04L 9/50* (2022.05); *H04L 67/1004* (2013.01)

(58) Field of Classification Search
CPC ..... H04L 63/0272; H04L 9/3236; H04L 9/50; H04L 67/1004; H04W 12/10; H04W 12/041; H04W 12/037; H04W 92/14
See application file for complete search history.

(56) References Cited

U.S. PATENT DOCUMENTS 10,448,251 B1 * 10/2019 Maria .................... H04W 12/06
11,388,017 B2 * 7/2022 Xie ........................ H04L 67/104
(Continued)

OTHER PUBLICATIONS

International Search Report dated Dec. 27, 2022 from the International Searching Authority in International Application No. PCT/JP2022/036496.
(Continued)

*Primary Examiner* — Farid Homayounmehr
*Assistant Examiner* — Mudasiru K Olaegbe
(74) *Attorney, Agent, or Firm* — Sughrue Mion, PLLC

(57) ABSTRACT

A system includes a radio node connected to a core network through the Internet. The system further includes a load balancer connected to the Internet and the radio node, a mobility management entity connected to the Internet and the core network, and a packet data network gateway connected to the Internet and the core network. The load balancer receives a plurality of Internet connections and consolidates the Internet connections into a single Internet connection to be provided to the radio node. The mobility management entity is configured to verify a core network connection request from a user equipment using a private blockchain network, and the packet data network gateway is configured to establish a virtual private network connection between the user equipment and the core network in response to successful verification of the core network connection request to provide permitted core network services to the user equipment.

13 Claims, 3 Drawing Sheets

(51) Int. Cl.
  *H04L 9/40*      (2022.01)
  *H04L 67/1004*   (2022.01)

(56) References Cited

U.S. PATENT DOCUMENTS

| | | | |
|---|---|---|---|
| 11,563,557 B2* | 1/2023 | Liu | H04L 9/3247 |
| 11,954,681 B2* | 4/2024 | Ling | G06Q 20/3825 |
| 2016/0105883 A1* | 4/2016 | Ghai | H04L 12/6418 |
| | | | 370/329 |
| 2020/0186607 A1* | 6/2020 | Murphy | G06Q 40/12 |
| 2020/0214081 A1* | 7/2020 | Spanton | G06F 16/1834 |
| 2020/0242602 A1* | 7/2020 | Jiang | G06F 16/27 |
| 2021/0006408 A1* | 1/2021 | Park | H04L 9/3239 |
| 2021/0160314 A1* | 5/2021 | Parvataneni | H04L 9/3239 |

OTHER PUBLICATIONS

Written Opinion dated Dec. 27, 2022 from the International Searching Authority in International Application No. PCT/JP2022/036496.

* cited by examiner

SYSTEM, METHOD AND NON-TRANSITORY COMPUTER READABLE MEDIUM FOR AN INTERNET-ENABLED NETWORK RADIO NODE

CROSS REFERENCE TO RELATED APPLICATIONS

This application is a National Stage of International Application No. PCT/JP2022/036496 filed Sep. 29, 2022.

TECHNICAL FIELD

The present disclosure relates generally to the field of mobile data networks, and in particular to the expansion of mobile networks using radio nodes.

BACKGROUND

In the current mobile network architecture, transmission hardware such as microwave (MW) links or fiber cables are used to connect Evolved Node B (eNB) and Next Generation Node B (gNB) radio nodes with a core network. Setting up microwave or fiber connection hardware requires the fiber or microwave infrastructure to already be available in the area. If microwave link access or a fiber optic connection is not available, the eNB or gNB radio nodes are not able to connect with the core network via microwave or fiber connections.

Unless microwave links or fiber connections are available for connecting the radio node, setting up network access for user equipment (UE) may not be possible. Even if setting up microwave links or fiber connections is possible, the amount of time needed to set up such connections can make setting up emergency network access (e.g., for certain temporary events or during a natural disaster) impossible. Further, microwave links and fiber connections are known to go down during natural disasters (e.g., storms, earthquakes and the like), which negatively impacts network user experience.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
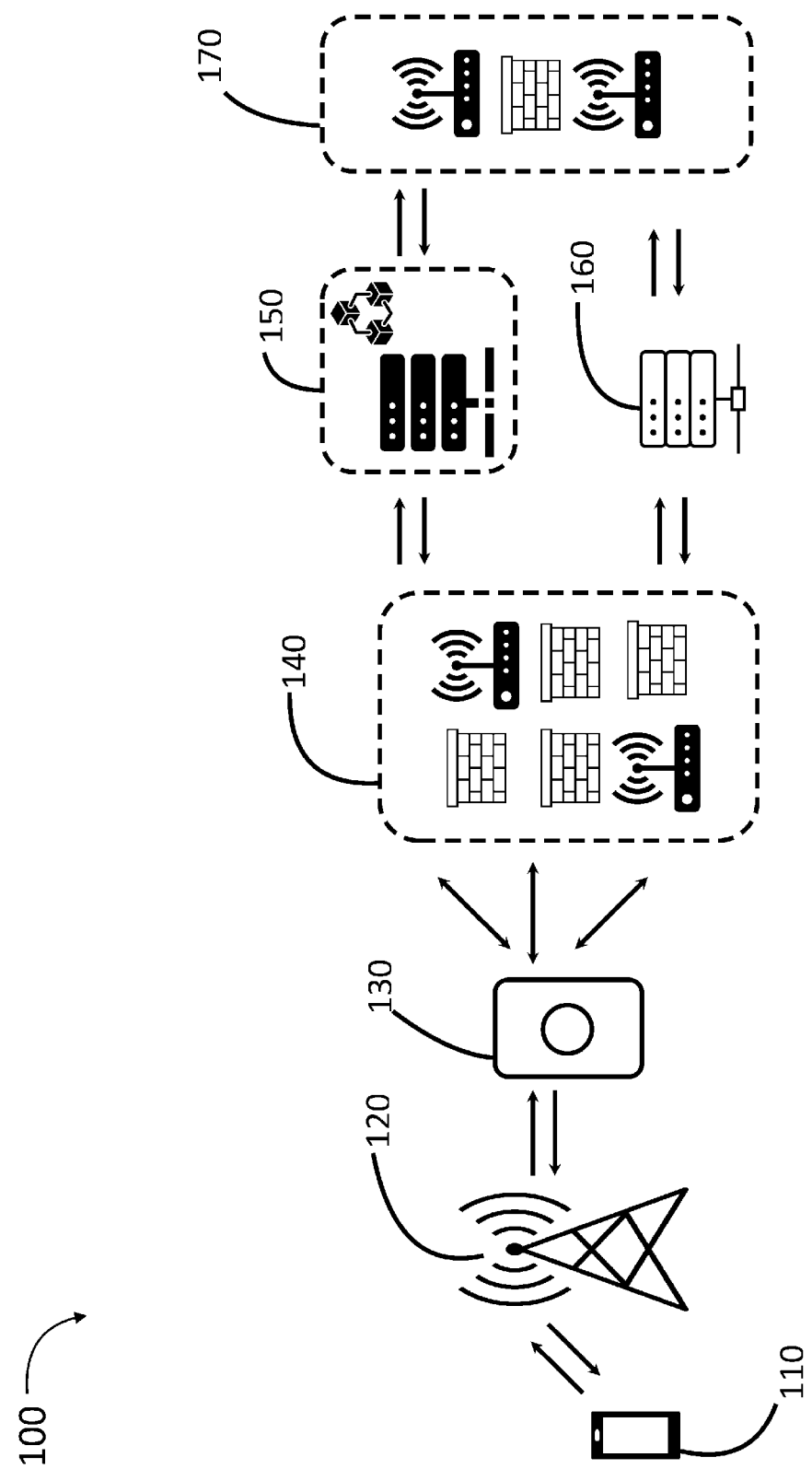
FIG. 1 is a schematic view of a system for expanding a network, using an Internet-enabled radio node, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the connection of a first feature to a second feature in the description that follows may include embodiments in which the first and second features are directly connected, and may also include embodiments in which additional features may be connected between the first and second features, such that the first and second features may not be in direct connection. In addition, the present disclosure may repeat reference numerals and/or letters in the various examples. This repetition is for the purpose of simplicity and clarity and does not in itself dictate a relationship between the various embodiments and/or configurations discussed.

Radio nodes (e.g., eNB and gNB nodes) can be used to expand coverage of wireless networks such as Radio Access Networks (RANs) and other types of networks that are used to provide wireless mobile access data services such as fourth-generation (4G) and fifth-generation (5G) wireless services. User access to these networks is provided via radio nodes that are connected to a core network and wirelessly communicate with user equipment such as mobile phones and other similar devices. In some approaches, radio nodes are connected to the core network via a microwave link. In some approaches, the radio node is connected to a core network via a fiber optic connection. In some approaches, the radio node is connected to a core network via a combination of microwave link and fiber optic connections. Radio nodes connected using microwave links and/or fiber optic connections require that these links and connections are available and accessible from the location where the radio node is placed. If microwave links or fiber optic connections are not available, the radio node will not be able to provide network access to users via microwave links or fiber optic connections.

In this application, a core network is a central part of a larger mobile network that allows subscribers access to network services that the subscribers are permitted to use. The core network includes nodes that represent a user plane (also referred to as "data plane" in this application) of the mobile network such as a serving gateway (SGW), packet data network gateway (PGW), and a control plane of the network, such as a mobility management entity (MME). The control plane handles network messaging and signaling, and is part of the routing architecture of the network that helps define network topology. In contrast, the user plane handles data traffic and the like.

In some embodiments, the mobility management entity is responsible for handling signals between active UEs and the network within a long-term evolution (LTE) and evolved packet core (EPC) architecture. The mobility management entity is also responsible for signaling between eNodeBs and the core network. In some embodiments, the mobility management entity is located at an edge of a LTE and EPC network. In some embodiments, the mobility management entity authenticates a user equipment by communicating with a home subscriber service (HSS), and the mobility function allows the user equipment to access the network and keeps track of its location and state. The home subscriber service is a central database that contains relevant details about a user equipment subscriber's information and user authentication. The home subscriber server also provides information for calls and IP session set up. This server helps service providers manage the information of their subscribers in real time. A regular mobile network can operate with only one HSS, but more than one can be used.

If there are two or more HHSs, the HHS servers synchronize their databases so that information is consistent across the multiple HHS databases.

In contrast, to traditional radio nodes that use microwave links or fiber connections to access a core network, a radio node that is capable of providing access to a core network via an available Internet connection will help provide network access to users even where microwave links and fiber optic connections are unavailable. Further, a radio node capable of using any available Internet connection can be deployed faster, with a simpler installation, and quicker integration with the core network, while at the same time providing a more robust connection and reducing costs versus microwave links and fiber optic connections.

FIG. 1 is a schematic view of a system 100 for implementing an Internet-enabled radio node in accordance with some embodiments. In some embodiments, the system 100 is a wireless communication system. In some embodiments, the system 100 is a wired communication system. In some embodiments, the system 100 includes a mixture of wireless and wired communication.

The system 100 includes a user equipment (UE) 110. The UE 110 is configured to send and receive data wirelessly to/from radio node 120. In some embodiments, the UE 110 is a user terminal, such as a mobile phone, a personal computer, or another suitable user equipment.

The system 100 includes a single UE 110. One of ordinary skill in the art would understand that the system 100 is capable of including more than one UE 110.

The radio node 120 is configured to send and receive data packets to/from to load balancer 130. Load balancer 130 is connected to the Internet 140. The load balancer 130 is configured to manage multiple Internet connections and consolidate the Internet connections into a single Internet connection. The consolidated Internet connection is connected to the radio node 120. In some embodiments, the radio node is connected to the Internet through two or more external Internet connections (e.g., any available Internet connections). In this application, these two or more Internet connections may be referred to as an "Internet module." In some embodiments, the load balancer orchestrates traffic to and from the Internet module, in both directions (e.g., uplink and downlink). In some embodiments, the load balancer 130 is integrated into radio node 120. In some embodiments, load balancer 130 is separate from the radio node 120. Internet 140 is any available Internet connection. Mobility management entity (MME) 150 is connected to Internet 140 and configured to provide mobility session management, support for subscriber authentication, roaming, and handovers to other networks associated with the UE 110. MME 150 includes a control plane S1-MME interface secured by blockchain for user verification and other appropriate security functions associated with the control plane portion of the data connection. Packet data network Gateway (PGW) 160 is connected to the Internet 140. PGW 160 includes a S1 user plane interface (S1-U) for handling user data traffic in the user plane portion of the data connection. The control plane and the user plane exist as separate data connections.

In some embodiments, the radio node assigns an Internet protocol (IP) address to the UE 110.

In some embodiments, the PGW 160 assigns an IP address to UE 110. In some embodiments, MME 150 uses private blockchain to secure the control plane.

In some embodiments, all core nodes are connected to a private blockchain network as blockchain nodes. These core nodes help to verify whether a user is able to use a particular network service. If a user is permitted to use a service, the radio node assigns an IP address and VPN connection to the user equipment which has permission to access the core network. permission is based on subscriber information. in some embodiments, permission is based on information other than subscriber information. In some embodiments, the PGW assigns the IP address and/or the VPN connection to the user. In some embodiments, all control plane signaling and messages are transferred upstream and downstream from the radio node to a core node through the blockchain network using smart contracts. In some embodiments control plane signaling and messages use a combination of blockchain smart contracts and non-blockchain messaging and signaling in the control plane. In some embodiments, when the user equipment requests to use a core network service, a smart contract that includes data associated with the requested service is automatically generated in response to the service request from the user equipment. In some embodiments, the smart contract is generated by the radio node and sent to a home subscriber service (HSS) database. In some embodiments, the radio node sends the smart contract to a policy and charging rules function (PCRF) server. In some embodiments, the radio node sends the smart contract to both the home subscriber service database and the policy and charging rules function server. In some embodiments, the radio node sends the smart contract to a server other than the home subscriber service database or policy and charging rules function server. In some embodiments, the home subscriber service is a database that contains relevant details about a subscriber's (e.g., the user of the user equipment) information and authentication details. In some embodiments, the home subscriber service provides information for setting up voice calls and IP sessions. In some embodiments, the policy and charging rules function server is a node on the blockchain network that functions to specify service policies and quality of service (QoS) information. The service policies and QoS information helps make sure that users receive the services they are subscribed to and that billing terms are provided. Billing terms include the costs of services, service levels, method of payment, and the like. In some embodiments, once a user is verified and permitted to access the requested core network service, (e.g., voice over IP (VoIP), data traffic, and the like) the packet network data gateway assists in the handling and routing of the traffic based on the approved user's subscription plan.

Figure 2:
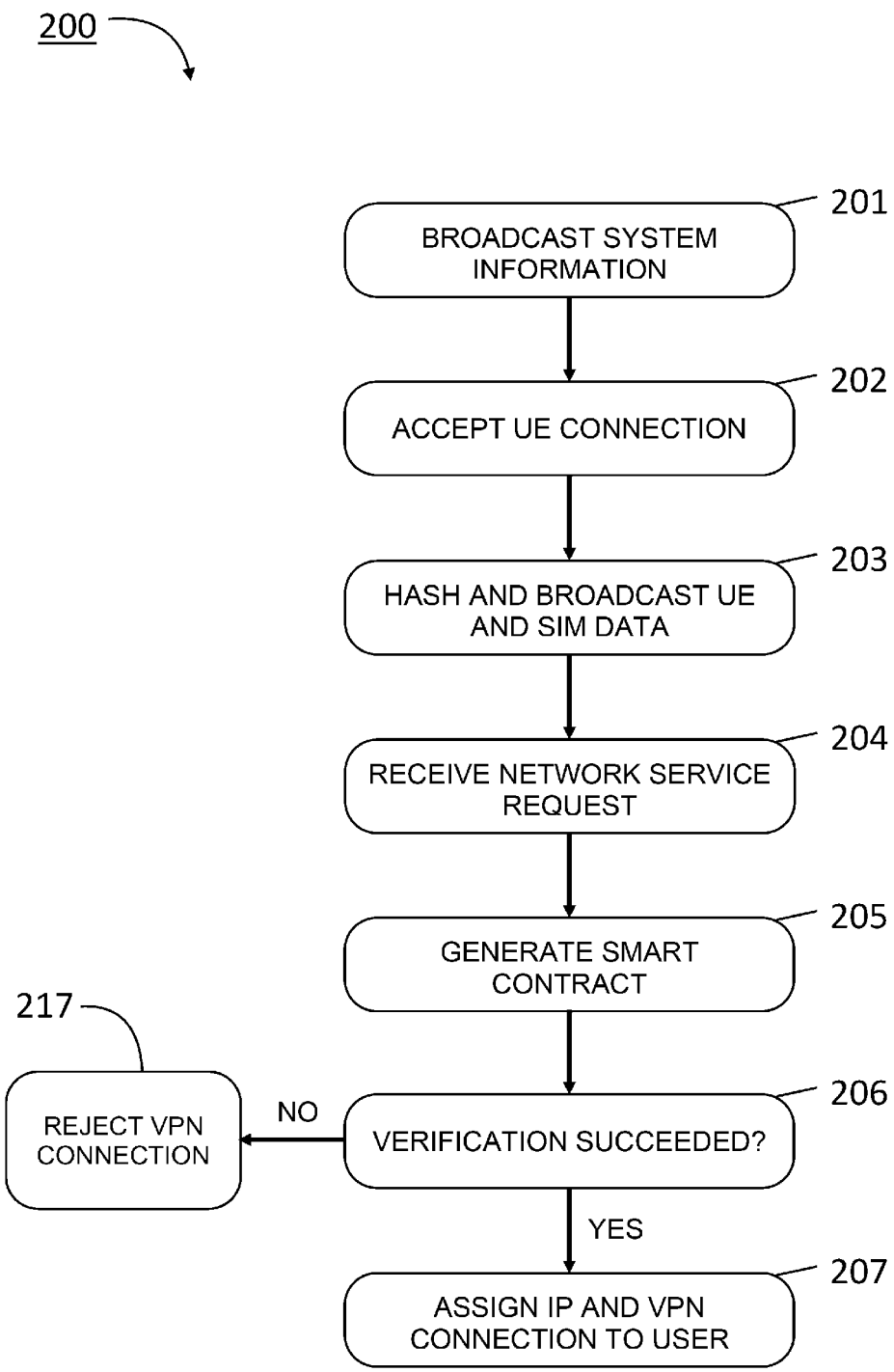
FIG. 2 is a flowchart for implementing a method for connecting to a network, using an Internet-enabled radio node, in accordance with some embodiments.

FIG. 2 is a flowchart for method 200 for connecting to a network, using an Internet-enabled radio node, in accordance with some embodiments. Method 200 employs blockchain and virtual private networking (VPN) so that an Internet-enabled radio node (e.g., eNB/gNB) can provide private network connectivity to user equipment (UEs) across the Internet. This type of network connectivity allows for network expansion using any available Internet connection and without having to use microwave links and/or fiber optic connections for network access. Blockchain technology helps to secure the control plane of the network. The radio node is treated as a block on the blockchain. A VPN connection is used to secure the user plane of the network, which is kept separate from the control plane.

In operation 201, in response to a UE entering radio coverage range of the radio node, the radio node will broadcast system information to the UE. In some embodiments, the system information includes a block hash key belonging to the radio node. In some embodiments, the system information may include appropriate information other than the block hash key belonging to the radio node.

In operation 202, the UE decodes the received radio node block hash key using a hash algorithm stored in a Subscriber Identity Module (SIM) that is connected to the UE. The UE sends the decoded block hash key of the radio node to the radio node and the radio node accepts a connection with the UE. That is, a two way connection is established between the UE and the radio node. In some embodiments, once the UE is connected to the network through the radio node, the UE will act as a node in the network blockchain.

In operation 203, SIM and other mobile device information of the UE is hashed and then broadcast to all blocks on the blockchain network. In some embodiments, the mobile device information includes an International Mode Subscriber Identity (IMSI) number. In some embodiments, the mobile device information includes an International Mode Equipment Identity (IMEI) number. In some embodiments, the mobile device information includes both an IMSI and IMEI number. In some embodiments, mobile device information includes appropriate information other than IMSI or IMEI numbers. In some embodiments, the mobile device information includes UE billing information associated with the UE and a user associated with the UE. In some embodiments, the mobile device information includes service subscription data associated with the UE. Examples of a service subscription include a voice calling plan (e.g., Voice over IP (VoIP)), data plan, or other appropriate service subscription information. The service subscription data may also indicate whether a user has an active or inactive subscription to any appropriate service, including services provided by the core network.

In operation 204, the radio node receives a request from the UE to use a service provided by the network. Services may include data services, Voice Over IP (VoIP) services, or other appropriate services. In some embodiments, operation 204 is optional.

In operation 205, in response to receiving the service request from the UE, a smart contract is automatically generated in order to verify whether the UE has permission to access the requested service. In some embodiments access is granted to the requested service based on whether a user associated with the UE has an active subscription to the requested service. In some embodiments, access to the requested service is determined based on whether the UE is permitted to access the requested service. In some embodiments, permission to access the requested service is determined using a combination of user information and UE information.

In some embodiments, determining whether the UE has permission to access the requested service is determined using appropriate information other than the aforementioned. In some embodiments, operation 205 is optional.

Operation 206 determines whether the verification of the information received in operation 204 succeeded. If verification succeeded (i.e., "YES" after operation 206) then the method proceeds to operation 207 where a VPN connection is established and the user can use the requested service over the VPN connection. If the verification fails (i.e., "NO" after operation 206) then establishment of the VPN connection is rejected (i.e., VPN is not established).

In operation 207, if the verification of operation 206 is successful, an Internet protocol (IP) address is assigned to the UE and a VPN connection is established for providing the requested service to the UE/user.

Figure 3:
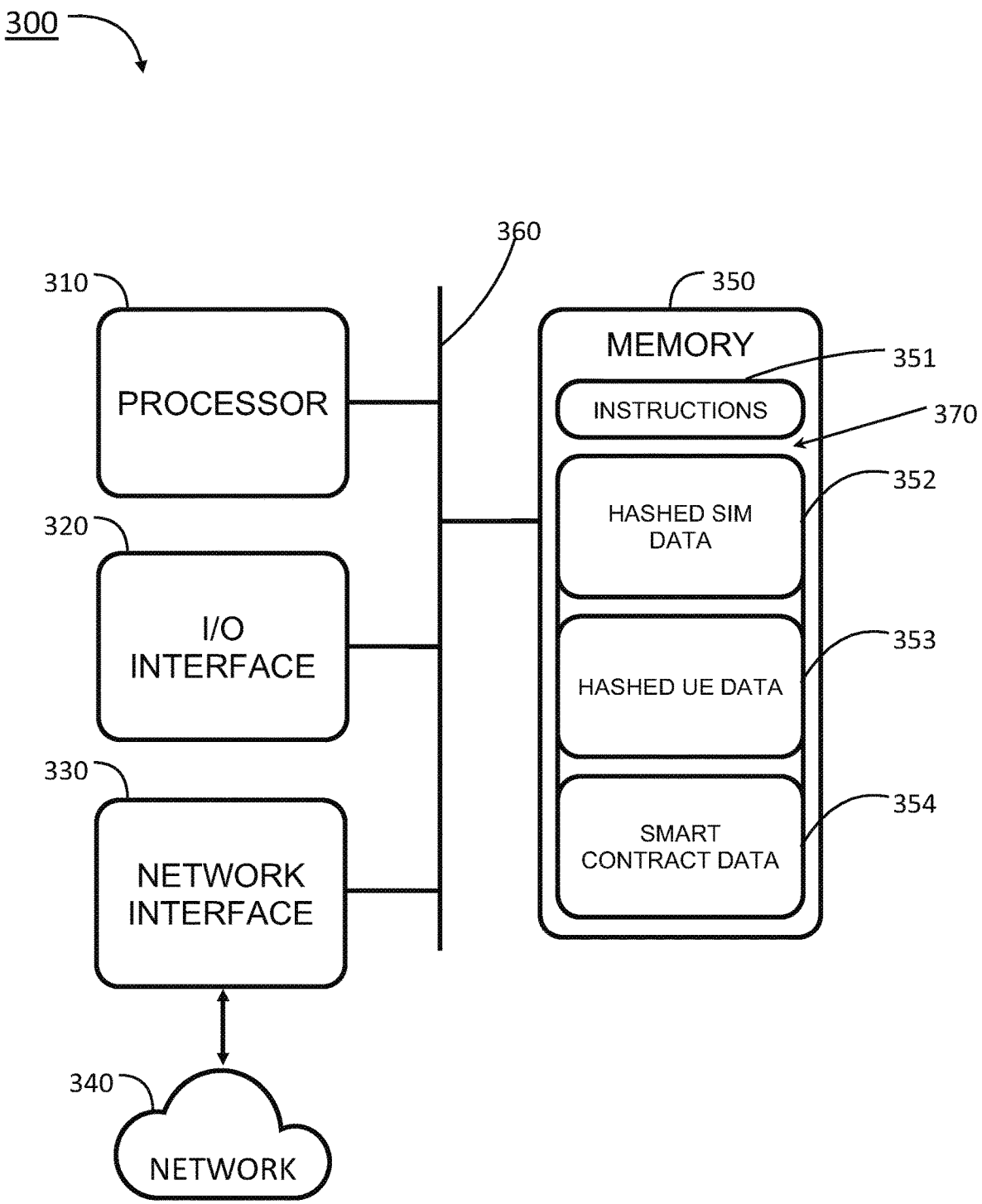
FIG. 3 is a block diagram of a system including a non-transitory computer readable medium for implementing a method for connecting to a network, using an Internet-enabled radio node, in accordance with some embodiments.

FIG. 3 is a block diagram of a system 300 for implementing a method for connecting to a network, using an Internet-enabled radio node, in accordance with some embodiments.

System 300 includes a hardware processor 310 and a non-transitory, computer readable storage medium 350 encoded with, (i.e., storing), the computer program code 370, (i.e., a set of executable instructions). Computer readable storage medium 350 is also encoded with instructions 351 for interfacing with different devices within a network. The processor 310 is electrically coupled to the computer readable storage medium 350 via a bus 360. The processor 310 is also electrically coupled to an I/O interface 320 by bus 360. A network interface 330 is also electrically connected to the processor 310 via bus 360. Network interface 330 is connected to a network 340, so that processor 310 and computer readable storage medium 350 are capable of connecting to external elements via network 340. The processor 310 is configured to execute the computer program code 370 encoded in the computer readable storage medium 350 in order to cause system 300 to be usable for performing a portion or all of the operations as described in method 200.

In some embodiments, the processor 310 is a central processing unit (CPU), a multi-processor, a distributed processing system, an application specific integrated circuit (ASIC), and/or a suitable processing unit.

In some embodiments, the computer readable storage medium 350 is an electronic, magnetic, optical, electromagnetic, infrared, and/or a semiconductor system (or apparatus or device). For example, the computer readable storage medium 350 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 350 includes a compact disk-read only memory (CD-ROM), a compact disk-read/write (CD-R/W), and/or a digital video disc (DVD).

In some embodiments, the storage medium 350 stores the computer program code 370 configured to cause system 300 to perform method 200. In some embodiments, the storage medium 350 also stores information needed for performing a method 200 as well as information generated during performing the method 200, such as hashed SIM data 352, hashed UE data 353, and smart contract data 354 and/or a set of executable instructions to perform the operation of method 200.

In some embodiments, the storage medium 350 stores instructions 351 for interfacing with external components within the network. The instructions 351 enable processor 310 to generate instructions readable by the external components to effectively implement method 200.

System 300 includes I/O interface 320. I/O interface 320 is coupled to external circuitry. In some embodiments, I/O interface 320 includes a keyboard, keypad, mouse, trackball, trackpad, and/or cursor direction keys for communicating information and commands to processor 310.

System 300 also includes network interface 330 coupled to the processor 310. Network interface 330 allows system 300 to communicate with network 340, to which one or more other computer systems are connected. Network interface 330 includes wireless network interfaces such as BLUETOOTH, WIFI, WIMAX, GPRS, or WCDMA; or wired network interface such as ETHERNET, USB, or IEEE-1394. In some embodiments, method 200 is implemented in two or more systems 300, and information such as memory type, memory array layout, I/O voltage, and I/O pin location are exchanged between different systems 300 via network 340.

An aspect of this disclosure relates to a system with a radio node electronically connected to the Internet, in which the radio node is configured to connect to a core network through the Internet. The system further includes a load balancer electronically connected to the Internet and the radio node, a mobility management entity electronically connected to the Internet and the core network, and a packet data network gateway electronically connected to the Internet and the core network. The load balancer is configured to receive a plurality of separate Internet connections and consolidate the Internet connections into a single Internet connection (e.g., an Internet module) to be provided to the radio node. The mobility management entity is configured to verify a core network connection request from a user equipment using a private blockchain network, and the packet data network gateway is configured to establish a virtual private network connection between the user equipment and the core network in response to successful verification of the core network connection request. In this application, "electronically connected" is a networking connection that may be a wired connection, wireless connection, or a combination of both wired and wireless connections. Devices that are electronically connected are not necessarily physically connected, but can be. In some embodiments, the radio node is further configured to connect to the packet data network gateway using the virtual private network connection for user plane handling, and to connect to the mobility management entity for signaling and control plane handling using the private blockchain network. In some embodiments, the load balancer is integrated into the radio node. In some embodiments, the radio node is configured to broadcast system information associated with the radio node to a user equipment upon that user equipment entering radio coverage range of the radio node. The system information includes a block hash key associated with the radio node. In some embodiments, the radio node broadcasts information other than or in addition to, information associated with the radio node. In some embodiments, the mobility management entity is configured to verify the core network connection request from the user equipment using a smart contract, where the chart contract includes data associated with the service requested by a user or user equipment.

In some embodiments, the mobility management entity and packet data network gateway exist as nodes on the private blockchain network. In some embodiments, all signaling and messaging in the control plane are handled through the private blockchain network.

An aspect of this disclosure relates to a method for connecting to a core network through the Internet, using a radio node connected to the Internet, where the radio node broadcasts system information associated with the radio node to a user equipment. Information broadcast by the radio node to the user equipment includes a block hash key. The method further includes receiving the decoded block hash key associated with the radio node, to the radio node, from the user equipment. The method further includes establishing a data connection using the radio node between the radio node and the user equipment. This connection is established in response to receiving the decoded block hash key associated with the radio node. The method further includes the radio node receiving data associated with the user equipment from the user equipment. The method further includes using a private key to hash the received data associated with the user equipment and broadcasting the hashed user equipment data to a plurality of blocks on a blockchain network. The method further include receiving a request from the user equipment to use a service provided by the core network, and automatically generating a smart contract in response to receiving the request from the user equipment to use the service, and the smart contract is used for verifying whether the user equipment is permitted access to the requested core network service. The method further includes automatically assigning an Internet Protocol (IP) address to the user equipment in response to successfully verifying that the user equipment is permitted to access the requested core network service, and automatically establishing a virtual private network connection between the user equipment and the core network, based on the successful verification that the user equipment is permitted access to the requested core network service. The method further includes providing the service requested by the user equipment to the user equipment. In some embodiments, the radio node broadcasts the data associated with the radio node comprising the block hash key to the user equipment in response to the user equipment entering a radio coverage range of the radio node. In some embodiments, the method further includes the radio node connecting to a packet data network gateway using a virtual private network connection and connecting to a mobility management entity using the blockchain network. In some embodiments, the packet data network gateway is connected to a user plane of the network, and the mobility management entity is connected to a control plane of the network. In some embodiments, the method further includes receiving by a load balancer, a plurality of Internet connections, consolidating, by the load balancer, the plurality of Internet connections into a single consolidated Internet connection, and establishing, by the load balancer, a connection between the radio node and the load balancer through the consolidated Internet connection. In some embodiments, verification of the core network request from the user equipment is carried out using a mobility management entity connected to the core network and the blockchain network. In some embodiments, verification of the core network request from the user equipment is carried out using a mobility management entity connected to the core network and the blockchain network, and the verification is carried out using a smart contract which include data associated with the service requested by the user equipment. In some embodiments, the mobility management entity and the packet data network gateway operate as nodes on the private blockchain network, with all signaling and messaging in the control plane being handled through the private blockchain network.

An aspect of this disclosure relates to a non-transitory computer readable medium storing instructions that, when executed by at least one processor, cause the at least one processor to perform operations including broadcasting, by a radio node connected to the Internet, system information associated with the radio node comprising a block hash key, to the user equipment, receiving, by the radio node, from the user equipment, the decoded block hash key associated with the radio node, establishing, by the radio node, a data connection between the radio node and the user equipment, in response to receiving the decoded block hash key associated with the radio node, receiving, by the radio node, from the user equipment, data associated with the user equipment, hashing, using a private key, the received data associated with the user equipment, broadcasting the hashed user equipment data to a plurality of blocks on a blockchain network, receiving a request, from the user equipment, to use a service provided by the core network, automatically generating, in response to receiving the request from the user equipment to use the service provided by the core network, a smart contract for verifying whether the user equipment is permitted access to the requested core network service, automatically assigning an Internet protocol (TP) address to the user equipment in response to verifying that the user equipment is permitted to access the requested core network service, automatically establishing a virtual private network connection between the user equipment and the core network, in response to verifying that the user equipment is permitted access to the requested core network service, and providing, to the user equipment, the service requested by the user equipment. In some embodiments, the radio node broadcasts the data associated with the radio node comprising the block hash key to the user equipment in response to the user equipment entering a radio coverage range of the radio node. In some embodiments, the operations performed by the processor further include connecting, using the radio node, to a packet data network gateway, using a virtual private network connection, and connecting, using the radio node, to a mobility management entity, using the blockchain network, where the packet data network gateway is connected to a user plane of the network, and the mobility management entity is connected to a control plane of the network. In some embodiments, operations conducted by the at least one processor further include receiving a plurality of Internet connections by a load balancer, consolidating, the plurality of Internet connections into a single consolidated Internet connection by the load balancer, and establishing, by the load balancer, a connection between the radio node and the load balancer through the consolidated Internet connection. In some embodiments, verification of the core network request received from the user equipment is carried out using a mobility management entity connected to the core network and the blockchain network. In some embodiments, verification of the core network request received from the user equipment is carried out using a smart contract comprising data associated with the requested for network service.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method for connecting a user equipment to a core network via the Internet, the method comprising:
broadcasting, by a radio node connected to the Internet, system information associated with the radio node comprising a block hash key, to the user equipment;
receiving, by the radio node, from the user equipment, a decoded block hash key corresponding to the broadcast block hash key;
establishing, by the radio node, a data connection between the radio node and the user equipment, in response to receiving the decoded block hash key;
receiving, by the radio node, from the user equipment, data associated with the user equipment;
hashing, using a private key, the received data associated with the user equipment;
broadcasting the hashed user equipment data to a plurality of blocks on a blockchain network;
receiving a request, from the user equipment, to use a service provided by the core network;
automatically generating, in response to receiving the request from the user equipment to use the service provided by the core network, a smart contract for verifying whether the user equipment is permitted access to the requested core network service;
automatically assigning an Internet protocol (IP) address to the user equipment in response to verifying that the user equipment is permitted to access the requested core network service;
automatically establishing a virtual private network connection between the user equipment and the core network, in response to verifying that the user equipment is permitted access to the requested core network service; and
providing, to the user equipment, the service requested by the user equipment.

2. The method of claim 1, wherein the radio node broadcasts the system information associated with the radio node comprising the block hash key to the user equipment in response to the user equipment entering a radio coverage range of the radio node.

3. The method of claim 1, further comprising:
connecting, using the radio node, to a packet data network gateway, using a virtual private network connection; and
connecting, using the radio node, to a mobility management entity, using the blockchain network,
wherein
the packet data network gateway is connected to a user plane of the core network, and
the mobility management entity is connected to a control plane of the core network.

4. The method of claim 1, further comprising:
receiving, by a load balancer, a plurality of Internet connections;
consolidating, by the load balancer, the plurality of Internet connections into a single consolidated Internet connection; and
establishing, by the load balancer, a connection between the radio node and the load balancer through the consolidated Internet connection.

5. The method of claim 1, wherein verification of the core network request is carried out using a mobility management entity connected to the core network and the blockchain network.

6. The method of claim 2, wherein
verification of the core network request is carried out using a mobility management entity connected to the core network and the blockchain network, and
the verification is carried out using a smart contract comprising data associated with the requested service.

7. The method of claim 3, wherein
the mobility management entity and the packet data network gateway operate as nodes on the private blockchain network, and
all signaling and messaging in the control plane are handled through the private blockchain network.

8. A non-transitory computer readable medium storing instructions that, when executed by at least one processor, cause the at least one processor to perform operations comprising:
broadcasting, by a radio node connected to the Internet, system information associated with the radio node comprising a block hash key, to a user equipment;
receiving, by the radio node, from the user equipment, a decoded block hash key corresponding to the broadcast block hash key;
establishing, by the radio node, a data connection between the radio node and the user equipment, in response to receiving the decoded block hash key;

receiving, by the radio node, from the user equipment, data associated with the user equipment;

hashing, using a private key, the received data associated with the user equipment;

broadcasting the hashed user equipment data to a plurality of blocks on a blockchain network;

receiving a request, from the user equipment, to use a service provided by a core network associated with the radio node;

automatically generating, in response to receiving the request from the user equipment to use the service provided by the core network, a smart contract for verifying whether the user equipment is permitted access to the requested core network service;

automatically assigning an Internet protocol (IP) address to the user equipment in response to verifying that the user equipment is permitted to access the requested core network service;

automatically establishing a virtual private network connection between the user equipment and the core network, in response to verifying that the user equipment is permitted access to the requested core network service; and providing, to the user equipment, the core network service requested by the user equipment.

9. The non-transitory computer readable medium of claim 8, wherein
the radio node broadcasts the data associated with the radio node comprising the block hash key to the user equipment in response to the user equipment entering a radio coverage range of the radio node.

10. The non-transitory computer readable medium of claim 8, wherein the operations further comprise:
connecting, using the radio node, to a packet data network gateway, using a virtual private network connection; and
connecting, using the radio node, to a mobility management entity, using the blockchain network,
wherein
the packet data network gateway is connected to a user plane of the core network, and
the mobility management entity is connected to a control plane of the core network.

11. The non-transitory computer readable medium of claim 8, wherein the operations further comprise:
receiving by a load balancer, a plurality of Internet connections;
consolidating, by the load balancer, the plurality of Internet connections into a single consolidated Internet connection; and
establishing, by the load balancer, a connection between the radio node and the load balancer through the consolidated Internet connection.

12. The non-transitory computer readable medium of claim 8, wherein
verification of the core network request is carried out using a mobility management entity connected to the core network and the blockchain network.

13. The non-transitory computer readable medium of claim 9, wherein
verification of the core network request is carried out using a mobility management entity connected to the core network and the blockchain network, and
the verification is carried out using a smart contract comprising data associated with the requested service.

* * * * *